(12) United States Patent
Kalkunte et al.

(10) Patent No.: US 7,826,481 B2
(45) Date of Patent: Nov. 2, 2010

(54) NETWORK FOR SUPPORTING ADVANCE FEATURES ON LEGACY COMPONENTS

(75) Inventors: Mohan Kalkunte, Sunnyvale, CA (US); Gurumurthy Yelewarapu, Santa Clara, CA (US); Puneet Agarwal, Cupertino, CA (US); Song-Huo Yu, Saratoga, CA (US); Venkateshwar Buduma, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1140 days.

(21) Appl. No.: 11/289,369

(22) Filed: Nov. 30, 2005

(65) Prior Publication Data

US 2006/0114938 A1 Jun. 1, 2006

Related U.S. Application Data

(60) Provisional application No. 60/631,581, filed on Nov. 30, 2004, provisional application No. 60/686,424, filed on Jun. 2, 2005.

(51) Int. Cl.
*H04J 3/16* (2006.01)
*H04L 12/54* (2006.01)

(52) U.S. Cl. .................. 370/467; 370/392; 370/428

(58) Field of Classification Search .......... 370/465–467, 370/310, 328, 329, 331, 351, 389, 390, 392, 370/428; 709/238
See application file for complete search history.

(56) References Cited

U.S. PATENT DOCUMENTS

| | | | |
|---|---|---|---|
| 6,041,042 A | 3/2000 | Bussiere | |
| 6,335,932 B2 | 1/2002 | Kadambi et al. | |
| 6,496,502 B1 | 12/2002 | Fite et al. | |
| 6,535,510 B2 | 3/2003 | Kalkunte et al. | |
| 6,674,743 B1 | 1/2004 | Amara et al. | |
| 6,792,502 B1 | 9/2004 | Pandya et al. | |
| 6,804,233 B1 | 10/2004 | Congdon et al. | |
| 6,807,179 B1 | 10/2004 | Kanuri et al. | |
| 6,963,921 B1 | 11/2005 | Yang et al. | |
| 6,993,026 B1 * | 1/2006 | Baum et al. | 370/392 |
| 7,020,139 B2 | 3/2006 | Kalkunte et al. | |
| 7,031,304 B1 | 4/2006 | Arberg et al. | |
| 7,054,315 B2 | 5/2006 | Liao | |
| 7,089,240 B2 | 8/2006 | Basso et al. | |
| 7,127,566 B2 | 10/2006 | Ramakrishnan et al. | |
| 7,139,753 B2 | 11/2006 | Bass et al. | |
| 7,161,948 B2 | 1/2007 | Sampath et al. | |
| 7,292,567 B2 | 11/2007 | Terrell et al. | |
| 7,292,573 B2 | 11/2007 | LaVigne et al. | |

(Continued)

OTHER PUBLICATIONS

Non-Final Office Action Received for U.S. Appl. No. 12/135,720, mailed on Mar. 19, 2009, 8 pages.

(Continued)

*Primary Examiner*—Ricky Ngo
*Assistant Examiner*—Paul Masur

(57) ABSTRACT

A network device that processes packets and includes at least one legacy component for performing basic processing on packets in the network device. The network device further includes at least one advanced component for performing advanced processing, which can not be performed by the legacy component, on packets in the network device. When an incoming packet to the legacy component requires advanced processing, the legacy component performs the basic processing and transmits the packet to a loop-back port on advanced component. Upon receiving the packet, basic processing is disabled on the advanced component and advanced processing is performed on the packet.

19 Claims, 2 Drawing Sheets

U.S. PATENT DOCUMENTS

| | | | |
|---|---|---|---|
| 7,313,135 B2 | 12/2007 | Wyatt | |
| 7,327,748 B2 | 2/2008 | Montalvo et al. | |
| 7,359,383 B2 | 4/2008 | Wakumoto et al. | |
| 7,382,787 B1 | 6/2008 | Barnes et al. | |
| 7,408,932 B2 | 8/2008 | Kounavis et al. | |
| 7,408,936 B2 | 8/2008 | Ge et al. | |
| 7,499,456 B2 | 3/2009 | De Silva et al. | |
| 7,570,639 B2 | 8/2009 | Kalkunte et al. | |
| 7,680,107 B2 | 3/2010 | Kalkunte | |
| 7,715,384 B2 | 5/2010 | Kalkunte et al. | |
| 2002/0010791 A1* | 1/2002 | Kalkunte et al. | 709/238 |
| 2002/0027908 A1 | 3/2002 | Kalkunte et al. | |
| 2002/0126672 A1 | 9/2002 | Chow et al. | |
| 2003/0123459 A1 | 7/2003 | Liao | |
| 2003/0142668 A1 | 7/2003 | Wyatt | |
| 2003/0147385 A1 | 8/2003 | Montalvo et al. | |
| 2004/0236720 A1 | 11/2004 | Basso et al. | |
| 2005/0008009 A1 | 1/2005 | Chen et al. | |
| 2005/0013306 A1 | 1/2005 | Albrecht | |
| 2005/0018693 A1 | 1/2005 | Dull | |
| 2005/0076010 A1 | 4/2005 | Bass et al. | |
| 2005/0083885 A1* | 4/2005 | Ikeda et al. | 370/331 |
| 2005/0083935 A1 | 4/2005 | Kounavis et al. | |
| 2005/0129019 A1 | 6/2005 | Cheriton | |
| 2005/0138149 A1 | 6/2005 | Bhatia | |
| 2005/0163102 A1 | 7/2005 | Higashitaniguchi et al. | |
| 2005/0180391 A1 | 8/2005 | Shimada | |
| 2005/0190773 A1 | 9/2005 | Yang et al. | |
| 2006/0002393 A1 | 1/2006 | Lappin, Jr. et al. | |
| 2006/0039383 A1 | 2/2006 | Ge et al. | |
| 2006/0050702 A1* | 3/2006 | Matsui et al. | 370/392 |
| 2006/0072572 A1* | 4/2006 | Ikeda et al. | 370/390 |
| 2006/0114876 A1 | 6/2006 | Kalkunte | |
| 2006/0114901 A1 | 6/2006 | Kalkunte et al. | |
| 2006/0114908 A1 | 6/2006 | Kalkunte et al. | |
| 2006/0114915 A1 | 6/2006 | Kalkunte et al. | |
| 2006/0140130 A1 | 6/2006 | Kalkunte et al. | |
| 2006/0182034 A1 | 8/2006 | Klinker et al. | |
| 2007/0025380 A1* | 2/2007 | Amagai et al. | 370/428 |
| 2007/0110078 A1 | 5/2007 | De Silva et al. | |
| 2008/0095062 A1* | 4/2008 | Shankar et al. | 370/249 |
| 2008/0117913 A1 | 5/2008 | Tatar et al. | |
| 2010/0142536 A1 | 6/2010 | Kalkunte et al. | |

OTHER PUBLICATIONS

Notice of Allowance Received for U.S. Appl. No. 11/289,499, mailed on Apr. 3, 2009, 16 pages.
Non-Final Office Action Received for U.S. Appl. No. 11/289,499, mailed on Oct. 15, 2008, 12 pages.
Non-Final Office Action Received for U.S. Appl. No. 11/289,368, mailed on Mar. 19, 2009, 9 pages.
Non-Final Office Action Received for U.S. Appl. No. 11/289,366, mailed on May 11, 2009, 9 pages.
Non-Final Office Action Received for U.S. Appl. No. 11/289,366, mailed on Oct. 27, 2008, 11 pages.
Non-Final Office Action Received for U.S. Appl. No. 11/289,370, mailed on Oct. 29, 2008, 7 pages.
Non-Final Office Action Received for U.S. Appl. No. 11/289,370, mailed on May 1, 2009, 7 pages.
Non-Final Office Action Received for U.S. Appl. No. 11/289,497, mailed on Oct. 15, 2008, 13 pages.
Final Office Action Received for U.S. Appl. No. 11/289,497, mailed on Mar. 18, 2009, 13 pages.
Notice of Allowance Received for U.S. Appl. No. 11/289,497, mailed on Jun. 12, 2009, 12 pages.
Final Office Action Received for U.S. Appl. No. 11/289,687, mailed on Jun. 30, 2009, 11 pages.
Non-Final Office Action Received for U.S. Appl. No. 11/289,687, mailed on Dec. 24, 2008, 9 pages.
Non-Final Office Action Received for U.S. Appl. No. 11/289,687, mailed on Aug. 5, 2008, 10 pages.
Notice of Allowance received for U.S. Appl. No. 11/289,368, mailed on Jan. 14, 2010, 18 pages.
Office Action received for U.S. Appl. No. 11/289,366, mailed on Jan. 25, 2010, 17 pages.
Office Action received for U.S. Appl. No. 11/289,687, mailed on Feb. 3, 2010, 17 pages.
Notice of Allowance received for U.S. Appl. No. 11/289,368, mailed on Sep. 15, 2009, 17 pages.
Notice of Allowance received for U.S. Appl. No. 11/289,370, mailed on Oct. 6, 2009, 12 pages.
Supplemental Notice of Allowability received for U.S. Appl. No. 11/289,497, mailed on Sep. 21, 2009, 17 pages.
Supplemental Notice of Allowability received for U.S. Appl. No. 11/289,370, mailed on Dec. 2, 2009, 8 pages.
Supplemental Notice of Allowability received for U.S. Appl. No. 11/289,497, mailed on Dec. 24, 2009, 17 pages.
U.S. Appl. No. 11/289,366 Non-Final Office Action mailed Jul. 6, 2010, 18 pages.
U.S. Appl. No. 11/289,370 Notice of Allowance mailed Aug. 11, 2010, 8 pages.
U.S. Appl. No. 11/289,687 Final Office Action mailed Sep. 7, 2010, 15 pages.
US 7,769,029, 08/2010, Kalkunte et al. (withdrawn)

* cited by examiner

NETWORK FOR SUPPORTING ADVANCE FEATURES ON LEGACY COMPONENTS

This application claims priority of U.S. Provisional Patent Application Ser. No. 60/631,581, filed on Nov. 30, 2004 and Ser. No. 60/686,424, filed on Jun. 2, 2005. The subject matter of these earlier filed applications is hereby incorporated by reference.

BACKGROUND OF THE INVENTION

1. Field of the Invention

The present invention relates to a network device in a packet switched network, and more particularly, to a method for enabling support of advanced features, such as Internet Protocol version 6 processing, by a packet switched network including legacy components.

2. Description of the Related Art

A current packet switched architecture enables customers to create scalable networks. A packet switched network may include one or more network devices, such as a Ethernet switching chip, each of which includes several modules that are used to process information that is transmitted through the device. These scalable networks may also include one or more "legacy components," i.e., component that do not support relatively new/advanced function, such as Internet Protocol version 6 (IPv6). IPv6 is an improved version of the current and most widely used Internet Protocol, IPv4, wherein IPv6 creates more addresses so that more people and device can connect to the Internet, in addition to other enhancements.

In addition to legacy devices, advance devices may also be included in these scalable network. These advanced devices typically include additional functions that are not present in the legacy devices. For example, these advanced devices typically support IPv6 functions. As data enters the scalable network, the data may enter through one of the legacy components. If the data requires IPv6 processing, the legacy component will not be able to handle the IPv6 processing even though one or more advanced components on the network support IPv6 processing. Therefore, there is a need to make legacy devices that are incorporated into a scalable network with at least one advance device IPv6 capable.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
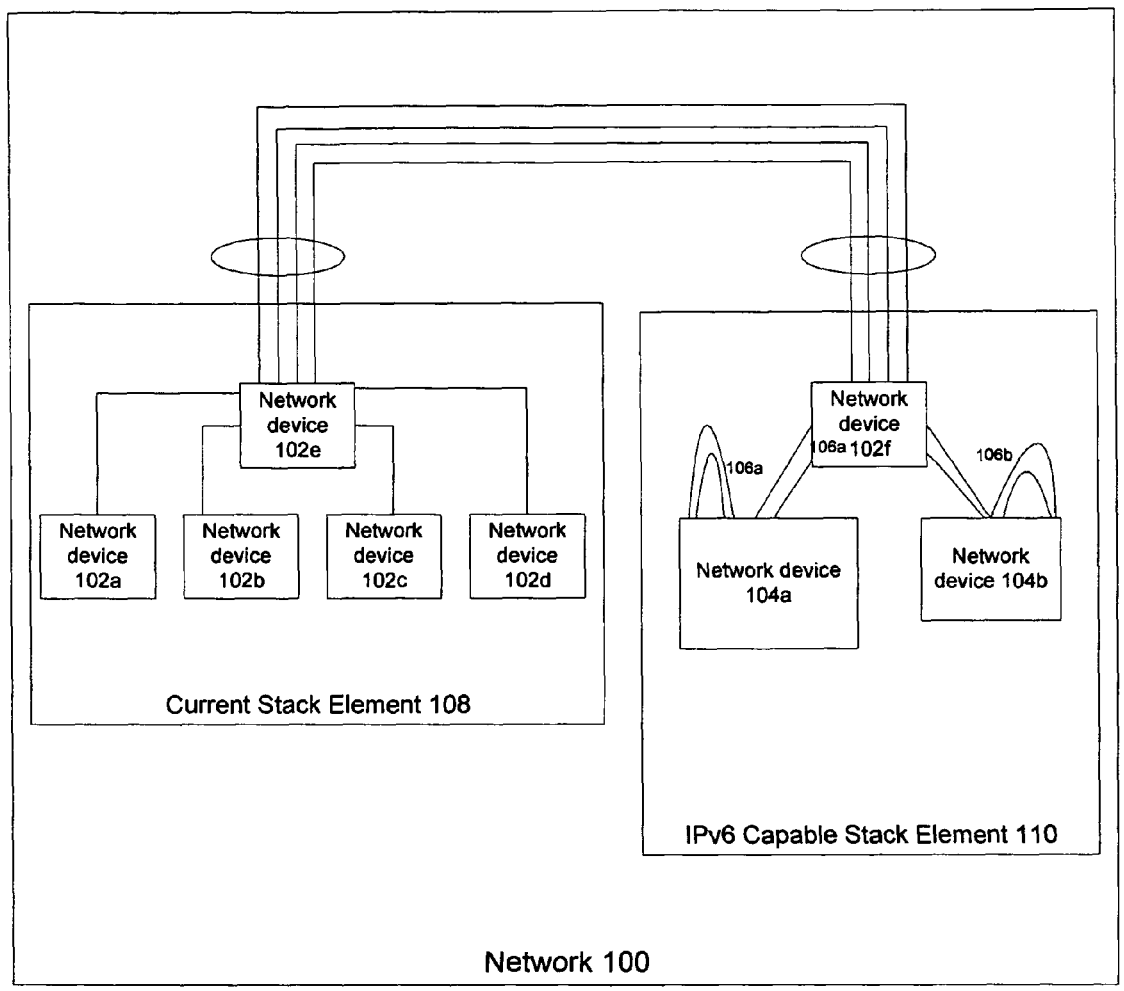
FIG. 1 illustrates a scalable network architecture in which an embodiment of the present invention may be implemented.

FIG. 1 illustrates a scalable network architecture 100 in which an embodiment of the present invention may be implemented. Network 100 may be a chassis or stackable device which includes a current stack element 108 that includes multiple legacy processing chip 102a-102f and an IPv6 capable stack element 110 with multiple advanced processing chips 104a-104b. Each of legacy chips 102a-102f may include 48 gigi ports and a back link connection or stacking link. Each of advanced chips 104a and 104b includes an associated loop-back interface port 106a and 106b to support a loop-back interface. Each of ports 106a and 106b may be a 10 G port or a 1 Gigi port.

Figure 2:
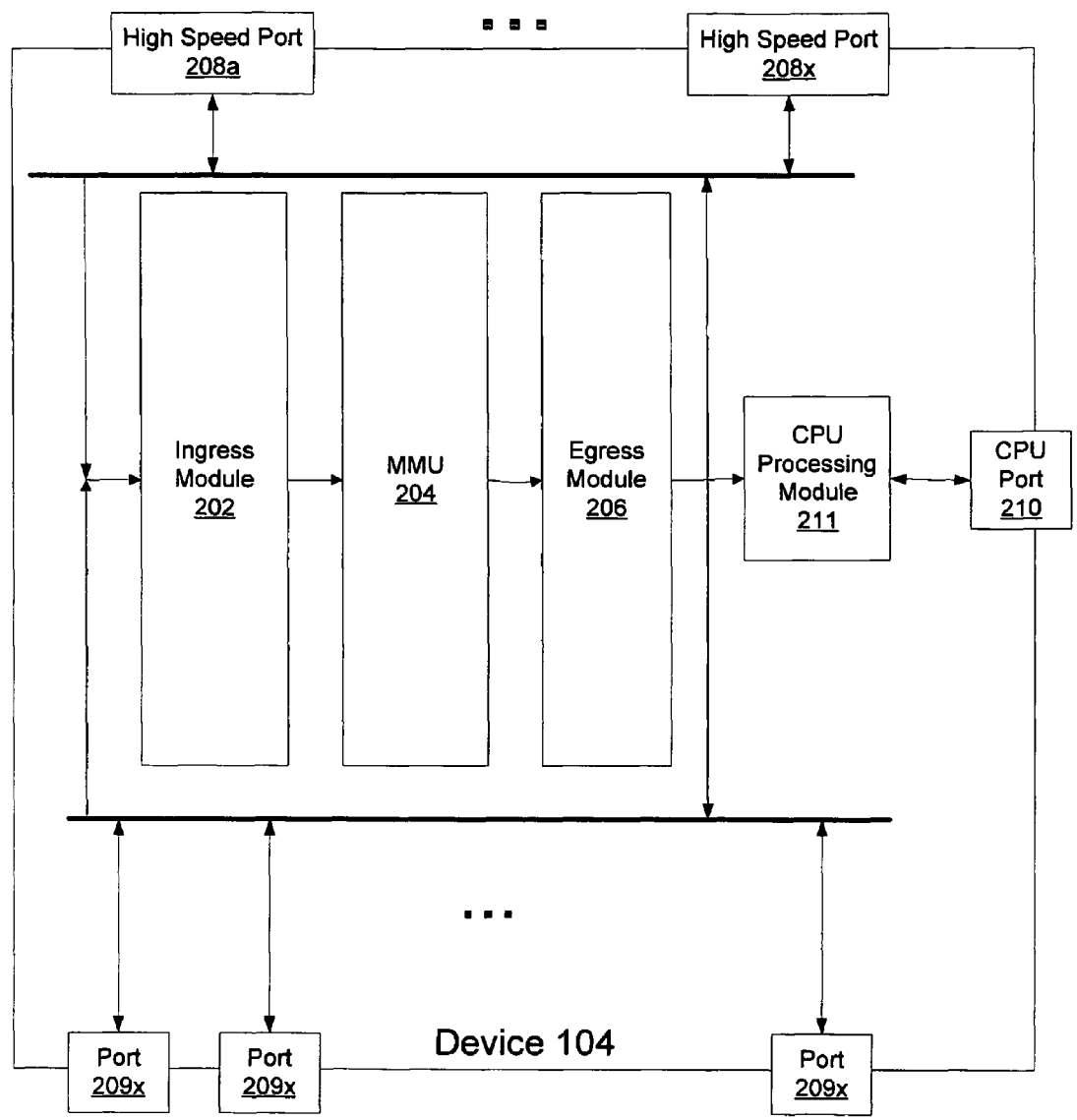
FIG. 2 illustrates a network device in which an embodiment of the present invention may be implemented.

FIG. 2 further illustrates advanced device 104 for providing IPv6 processing to a mixed network architecture 100. Advanced device 104 includes an ingress module 202, a MMU 204, and an egress module 206. Ingress module 202 is used for performing switching functionality on an incoming packet. MMU 204 is used for storing packets and performing resource checks on each packet. Egress module 206 is used for performing packet modification and transmitting the packet to an appropriate destination port. Each of ingress module 202, MMU 204 and Egress module 206 includes multiple cycles for processing instructions generated by that module. Advanced device 104 implements a pipelined approach to process incoming packets. The key to the performance of advanced device 104 is the ability of the pipeline to process one packet every clock. According to an embodiment of the invention, advanced device 104 includes a 133.33 MHz core clock. This means that the advanced device 104 architecture is capable of processing 133.33M packets/sec.

Advanced device 104 may also include one or more internal fabric high speed ports, for example a HiGig port, 208a-208x, one or more external Ethernet ports 209a-209x, and a CPU port 210. High speed ports 208a-208x are used to interconnect various network devices in a system and thus form an internal switching fabric for transporting packets between external source ports and one or more external destination ports. As such, high speed ports 208a-208x are not externally visible outside of a system that includes multiple interconnected network devices. CPU port 210 is used to send and receive packets to and from external switching/routing control entities or CPUs. According to an embodiment of the invention, CPU port 210 may be considered as one of external Ethernet ports 209a-209x. Advanced device 104 interfaces with external/off-chip CPUs through a CPU processing module 211, such as a CMIC, which interfaces with a PCI bus that connects advanced device 104 to an external CPU.

Network traffic enters and exits advanced device 104 through external Ethernet ports 209a-209x. Specifically, traffic in advanced device 104 is routed from an external Ethernet source port to one or more unique destination Ethernet ports 209j-209x. In one embodiment of the invention, advanced device 104 supports physical Ethernet ports and logical (trunk) ports. A physical Ethernet port is a physical port on advanced device 104 that is globally identified by a global port identifier. In an embodiment, the global port identifier includes a module identifier and a local port number that uniquely identifies advanced device 104 and a specific physical port. The trunk ports are a set of physical external Ethernet ports that act as a single link layer port. Each trunk port is assigned a global a trunk group identifier (TGID). According to an embodiment, advanced device 104 can support up to 128 trunk ports, with up to 8 members per trunk port, and up to 29 external physical ports. Destination ports 209j-209x on advanced device 104 may be physical external Ethernet ports or trunk ports. If a destination port is a trunk port, advanced device 104 dynamically selects a physical external Ethernet port in the trunk by using a hash to select a member port. The dynamic selection enables advanced device 104 to allow for dynamic load sharing between ports in a trunk.

Typically, each packet entering network device 102a-102f or 104a-104b may be one of a unicast packet, a broadcast packet, a muliticast packet, or an unknown unicast packet. The unicast packet is transmitted to a specific destination address that can be determined by ingress network device 102a-102f or 104a-104b. The broadcast packet is typically sent to all ports by ingress network device 102a-102f or 104a-104b and the multicast packet is sent to multiple specific ports by ingress network device 102a-102f or 104a-104b. According to one embodiment of the invention, to multicast or broadcast a packet, specific bits in the packet are set prior to transmission of the packet to ingress network device 102a-102f or 104a-104b. An unknown unicast packet is one in which ingress network device 102a-102f or 104a-104b cannot determine the associated destination address. So ingress network device 102a-102f or 104a-104b broadcasts the packet which is ignored by all ports except the intended but previously unknown destination port. When the previously unknown destination port sends a response message to sending/ingress network device 102a-102f or 104a-104b, all network devices "learn" the address associated with the destination port. Thereafter, any unicast packet sent to the destination port is transmitted as a traditional unicast packet.

Once a unicast packet enters network 100 through one of legacy processing devices 102, all normal layer 2 processing is performed on the ingress device, for example 202a. Specifically, all basic processing such as, VLAN assignment, Learning and parsing are performed by legacy ingress device 202a. However, if the incoming packet requires IPv6 processing, legacy ingress device 202a is unable to parse IPv6. Therefore, legacy ingress device 202a transmits all IPv6 packets that need to be routed to one of ports 106a or 106b that supports loop-back interface.

According to one embodiment of the invention, legacy ingress device 102a uses a layer 2 table to forward the packet to port 106. This embodiment implies that there is a separate Medium Access Control Destination Address (MAC DA) for IPv6 packets as opposed to IPv4 packets. Specifically, the destination port in the layer 2 table is equal to port 106 and legacy ingress device 202a determines if the packet is to be bridged or routed by checking the MAC DA to see if it is that of a router. If it is, ingress device 202a then uses an IP address in a host table or a route table to bridge the packet to port 106. If the packet is not to be routed, ingress device 202a bridges the packet to the appropriate destination. According to this embodiment, the router destination address is pre-programmed at a layer 3 bit in the layer 2 table. However, in this embodiment, ingress device 202a does not set the layer 3 bit in the layer 2 table, but only uses the layer 3 bit to bridge the packet to port 106. Legacy ingress device 202a transmits the packet to port 106 on Higig ingress 208 as a layer 2 unicast packet.

In another embodiment of the invention, legacy ingress device 202a may use a fast filter processor (FFP) to redirect packets with a set MAC DA to port 106. Specifically, the FFP filters the packet on the IPv6 MAC DA and a predefined Ethertype and redirects the packet to port 106. This embodiment does not require a distinct IPv6 MAC DA from that of IPv4 MAC DA.

The packet then enters on high speed ingress 208 as either a layer 2 unicast packet or a layer 2 broadcast packet, as outlined below, if the packet is an unknown unicast packet. Thereafter, normal layer 2 high speed processing is performed on the packet. Specifically, learning occurs with identifier—$VID_{in}$ and MAC Source Address (MAC SA). The packet is then sent to port 106 tagged with the identifier—$VID_{in}$.

As such, the packet enters port 106 as a tagged Ethernet packet. If, however, the packet is not tagged, it is dropped by advanced device 104. Since layer 2 processing on the packet was previously performed by legacy device 102a, learning and VLAN assignment are disabled on this layer 2 port, i.e., port 106. Advanced device 104 then performs, at port 106, normal IPv6 layer 3 processing, layer 3 packet checks and modifications and sets the layer 3 bit in the layer 2 table. The packet is then sent out with a new MAC Destination Address (MAC DA), MAC SA, identifier—$VID_{out}$ to the egress port as a unicast packet.

At the egress device, the packet enters as a high speed unicast packet. Note that the egress device may be either a legacy device 102 or an advanced device 104. No learning occurs at egress device 102 or 104 because the layer 3 bit in the high speed header was set by advance device 104. Egress device 102 or 104 then sends the packet set to an outgoing port that is specified in the high speed header and performs normal layer 2 checks and modifications.

Alternatively, the packet may enter network 100 as a multicast packet. Similar to the unicast packet, a multicast packet may enter network 100 through one of legacy processing chips 102 where all normal layer 2 processing are performed. Furthermore, ingress VLAN based layer 2 multicast forwarding is also performed in legacy ingress device 102. In one embodiment of the invention, legacy ingress device, for example device 102a, uses a layer 2 multicast table to assign a layer 2 index to the packet. The layer 2 index is used to determine a layer 2 multicast distribution tree that is used to transmit the packet to all listeners/receivers associated with the layer 2 multicast group specified by the incoming packet. Specifically, for each multicast IPv6 packet, loop-back interface port 106a or 106b must be a part of the layer 2 multicast distribution tree. One embodiment of the invention requires software in legacy ingress device 102a to ensure that a loop back port 106 is a part of the layer 2 multicast tree. Thereafter, the layer 2 multicast index is sent along with the packet on high speed ingress 208. In one embodiment of the invention, if there are no available layer 2 multicast table entries associated with the packet, the packet may optionally be broadcast on an incoming VLAN. Software on ingress legacy device 102 must also ensure that port 106 is a part of the identifier—$VID_{in}$ broadcast tree.

The packet then enters on high speed ingress 208 either as either a layer 2 multicast packet or a layer 2 broadcast packet. Thereafter, normal layer 2 high speed processing is performed on the packet. Specifically, learning occurs with $VID_{in}$ and MAC SA. The layer 2 multicast table is looked up with the layer 2 multicast index in the packet and the packet is then sent to one of ports 106a or 106b tagged with the $VID_{in}$.

When the packet enters port 106 as a tagged Ethernet packet, learning and VLAN assignment are disabled on layer 2 port 106. Just like unicast packets, if the packet is not tagged, it is dropped by advanced device 104. All layer 3 processing and modifications are performed at port 106. Port 106 also performs IPv6 multicast lookup, in an IP/layer 3 multicast table, for IP multicast routing information. In one embodiment of the invention, the lookup is performed based on the IPv6 source, IPv6 group and $VID_{in}$ associated with the incoming packet. Port 106 then assigns a layer 3 IP multicast index that determines the ingress layer 2 and egress layer 3 distribution trees for the packet. According to an embodiment of the invention, there is a special property associated with port 106 to ignore the layer 2 port bitmap in the IP multicast table. It should be noted, however, that the layer 2 port bitmap may be set for incoming packets on non-loop-back interface ports on advanced device 104.

For each outgoing VLAN for a given source, group and identifier—$VID_{in}$, the packet is replicated and given a new identifier—$VID_{out}$ and MAC source address. The packet is then internally multicast to all the egress chips that have multicast listeners for the given $VID_{out}$. A unique multicast identifier is carried with the replicated packets. As such, packets on the high speed egress 208 travel as IP multicast packets with the $VID_{out}$ as the assigned VLAN. Note that since layer 2 replication was already performed on legacy ingress device 102, the packet is always VLAN modified on port 106. In an embodiment of the invention, all VLAN $VID_{out}$ replication is performed by advance device 104 regardless of whether the outgoing ports are local or remote.

Specifically, for IPv6 multicast packets, an unmodified packet is sent to all ports that are part of the distribution tree identified by the layer 3 IP multicast index. Each port then individually determines if it needs to send the unmodified copy of the packet, i.e., the layer 2 copy, and one or more layer 3 (VLAN replicated) copies. It should be noted that since legacy ports 102a-102f do not understand IPv6, they will be unable to make layer 3 copies of the IPv6 packet. As such, advanced device 104 has to make a separate copy for every outgoing layer 3 interface and then sends each copy with the new VLAN layer 3 interface to all egress devices in the distribution tree of that particular layer 3 interface. In one embodiment, advanced device 104 makes the required layer 3 copies for its local Ethernet ports. Since the receiver set for each outgoing layer 3 interface is distinct and unique from other outgoing layer 3 interfaces, the distribution tree for each outgoing layer 3 interface has to be uniquely identified. As such, for each outgoing layer 3 interfaces, advanced device 104 associates a unique multicast identifier with transmitted layer 3 replicated packets over high speed egress 208.

Since the IP multicast table is a shared table, one embodiment of the invention provides a mechanism that informs the hardware when to generate a distinct and unique layer 3 multicast index for layer 3 replications over high speed egress 208. This embodiment includes chip wide hardware registers. Specifically, a replication enable register is used to enable the support of layer 3 replication when egress port 102 or 104 is a high speed port; a replication base register is used to define a lower limit of allowed values of the packet's IP multicast index to enable layer 3 replication on the high speed egress; and a replication limit register is used to define an upper limit of allowed values of the packet's IP multicast index to enable layer 3 replication on the high speed egress. In one embodiment of the invention the replication enable register is a 1 bit register, the replication base register is a 10 bit register and the replication limit register is a 10 bit register. As such, the registers are used to determine the range of layer 3 multicast indices from which a unique layer 3 multicast index needs to be generated by MMU 204 for each outgoing layer 3 interface.

Specifically, if the outgoing port is a high speed port, if the replication enable register is set and if the replication base register is less than or equal to the packet's IP multicast index which is less than or equal to the replication limit register, then the unique layer 3 IP multicast index is generated for every layer 3 interface by incrementing the packet's IP multicast index. In an embodiment of the invention, software associated with advance device 104 ensures that there is a block of IP multicast indices that is reserved for an incoming packet in the IP multicast table. According to this embodiment, the software sets aside all layer 3 IP multicast indices in the range of the replication base register and replication limit register so that these indices are not used for other purposes.

In the situation where the incoming packet enters on non-loop back port on advanced device 104, instead of on a legacy ingress port, the packet will be looked up in the same IP multicast table that is used by port 106. As such, the layer 2 port bitmap for the source, group and $VID_{in}$ should be the list of layer 2 receivers on the incoming VLAN. In this situation, the layer 3 IP multicast index entries, including the layer 2 port bitmap, should not include port 106.

Furthermore, in the situation where there are multiple advanced devices 104 in a system, along with legacy devices 102, it is possible that for an incoming packet into advance device 104a, the original packet was previously layer 3 replicated and sent out with unique IP multicast indices for every outgoing layer 3 interface by port 106 on advanced device 104. Since the layer 3 replication was already performed, the layer 3 port bitmap for the layer 3 IP multicast index must be ignored on the high speed of advanced device 104b. As such, an embodiment of the invention requires that software on all devices 102 and 104 set the layer 3 port bitmap to zero for already replicated packets.

To ensure that first, the layer 2 bitmap is zeroed out on loop-back interface port 106, that second, on Ethernet, non-loop back interface ports on advanced device 106, the layer 2 and layer 3 bitmaps are honoured for the layer 3 multicast index and that third, on high speed ports, the layer 3 bitmap is zeroed out for the layer 3 multicast index that have already been replicated, every ingress port on devices 102 and 104, in one embodiment includes a clear bit for the layer 2 port bitmap and a clear bit the layer 3 port bitmap. Furthermore, to ensure that devices 102 and 104 remove the layer 2 and layer 3 port bitmaps for layer 3 multicast indexes appropriately, one embodiment includes a legacy clear enable register, a legacy clear base register and a legacy clear limit register. The legacy clear enable register is a one bit register for enabling the feature of clearing the layer 2 and layer 3 port bitmaps. The legacy clear base register is a 10 bit register that defines the lower limit of allowed values for the packet's layer 3 multicast index to enable the clearing of the layer 2 and layer 3 port bitmaps. The legacy clear limit register is a 10 bit register that defines the upper limit of allowed values for the packet's layer 3 multicast index to enable the clearing of the layer 2 and layer 3 port bitmaps.

After the IP multicast index for IP multicast packets has been determined on all ingress ports, device 102 or 104 checks if the legacy clear enable bit is set and if the legacy clear base register is less than or equal to the packet's IP multicast index which is less than or equal to the legacy clear limit register. If all of the conditions above are met, the device checks to see if the clear bit for the layer 2 port bitmap on the incoming port is set, and if it is, the layer 2 bitmap is zeroed. If, however, the clear bit for the layer 2 port bitmap on the incoming port is not set, the layer 2 bitmap is set to the layer 3 IP multicast index's layer 2 port bitmap. Then the device checks to see if the clear bit for the layer 3 port bitmap on the incoming port is set, and if it is, the layer 3 bitmap is zeroed. If the layer 3 port bitmap on the incoming port is not set, the layer 3 bitmap is set to the layer 3 IP multicast index's layer 3 port bitmap.

At the egress device, the packet enters as an IP multicast packet. Note that the egress device may be either legacy device 102 or an advanced device 104. Normal layer 2 checks and modifications are performed by egress device 102 or 104. The unique multicast ID in the module header is used to index the IP multicast table. Specifically, the layer 2 port bitmap contains the list of local outgoing ports that have listeners for the packet. Software in egress device 102 or 104 ensure that the layer 3 bitmap for the IP multicast table entry is set to zero.

Each outgoing VLAN that is indirectly specified by the unique multicast pointer will have is own layer 2 bitmap to specify the unique set of listeners on that VLAN. According to one embodiment of the invention, outgoing layer 3 replicated packets can optionally be sent as layer 2 broadcast packets to optimize IP multicast entries.

In a mixed system, i.e. a system with legacy devices 102 and advanced devices 104, that is IPv6 multicast enabled, the various ports of the advance device may be programmed as follows: For all regular customer facing Ethernet ports, the clear bit for the layer 3 port bitmap and the clear bit for the layer 2 port bitmap are set to zero. For all loop back interface ports 106, the clear bit for the layer 3 port bitmap is set to zero and the clear bit for the layer 2 port bitmap are set to one. For all the high speed ports, the clear bit for the layer 3 port bitmap is set to one and the clear bit for the layer 2 port bitmap is set to zero.

It should be noted that while the above disclosure is directed to IPv6 processing, the present invention is not restricted to IPv6 processing. For example, the IPv6 replication described above can be used for IPv4 multicast replication that is not available on legacy systems as well for other proxy features such as WLAN and VPLS/MPLS.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for processing packets, the network device comprising:
    at least one legacy component configured to perform basic processing on packets in the network device, and, if the packets require advanced processing, to perform basic processing and transmit the packets to a loop-back port on an advanced component; and
    at least one advanced component configured to:
        perform advanced processing on packets in the network device which the legacy component is not configured to perform;
        upon receiving a packet from the legacy component, disable basic processing;
        perform the advanced processing on the packet, the advanced processing including:
            if the packet is an unmodified packet, transmitting the packet to at least one port included in an ingress layer 2 distribution tree, the at least one port being configured to determine whether to send at least one of a layer 2 copy or a layer 3 copy of the packet; and
            if the packet received from the legacy component is a multicast packet, performing a layer 3 multicast lookup for layer 3 routing information and to assign a layer 3 multicast index to the packet.

2. The network device of claim 1, wherein the legacy component is configured to use a layer 2 table for forwarding the incoming packet to the advanced component, wherein a destination port in the layer 2 table is equal to the loop-back port.

3. The network device of claim 2, wherein the legacy component is configured to determine if the incoming packet is to be bridged or routed to the loop-back port, wherein a router destination address is predefined in a bit in the layer 2 table.

4. The network device of claim 1, wherein the legacy component is configured to transmit the packet to the advanced component through a high speed ingress, wherein in the high speed ingress, layer 2 high speed processing is performed on the packet and the packet is tagged with an incoming identifier.

5. The network device of claim 1, wherein the legacy component is configured to use a fast filter processor to direct incoming packets with a predefined field to the loop-back port, wherein the fast filter processor filters the packet on the predefined field and directs the packet to the advanced component.

6. The network device of claim 1, wherein the legacy component is configured to perform layer 2 processing and VLAN based layer 2 multicast forwarding on the packet and the advanced component is configured to perform layer 3 processing and modification, to set a layer 3 bit in a layer 2 table and to transmit the packet to an egress component with at least a new outgoing identifier.

7. The network device of claim 6, wherein the egress component is configured to perform layer 2 checks and modification and to transmit the packet to an outgoing port without performing learning operations.

8. The network device of claim 1, further configured to accept the incoming packet as one of a unicast packet or a multicast packet.

9. The network device of claim 1, wherein the legacy component is configured to use, for a multicast packet, a layer 2 multicast table to assign a layer 2 index to the packet, wherein the layer 2 index is used to determine a layer 2 multicast distribution tree that is used to transmit the packet to a plurality of receivers associated with a layer 2 multicast group that is specified by the packet.

10. The network device of claim 9, wherein the network device is configured to include the loop-back port in the layer 2 multicast distribution tree.

11. The network device of claim 9, wherein the legacy component is configured to broadcast the packet if there are no entries in the layer 2 multicast table associated with the packet.

12. The network device of claim 1, wherein the layer 3 multicast index is configured to determine the ingress layer 2 distribution tree and an egress layer 3 distribution tree for the packet.

13. The network device of claim 12, further comprising:
    a replication enable register for enabling layer 3 replication when an egress port is a high speed port;
    a replication base register for defining a lower limit of allowed values of the layer 3 multicast index to enable layer 3 replication on the high speed egress port; and
    a replication base register for defining an upper limit of allowed values of the layer 3 multicast index to enable layer 3 replication on the high speed egress port,
    wherein if an outgoing port is a high speed port, the replication enable register is set and the replication base register is less than or equal to the layer 2 multicast index which is less than or equal to the replication base register, then a unique layer 2 multicast index is generated for every layer 3 replicated packet.

14. The network device of claim 1, wherein the loop-back port is configured to ignore, for a multicast packet, a layer 2 port bitmap in a layer 3 multicast table.

15. The network device of claim 1, wherein the advanced component is configured to replicate the multicast packet for each outgoing VLAN for a given set of fields, to assign a new outgoing identifier to the packet and to multicast the packet to all egress components that have listeners for the new outgoing identifier, wherein a unique multicast identifier is carried with the replicated packet and the packet is VLAN modified at the loop back port.

16. The network device of claim 1, wherein the packet includes the unmodified packet.

17. The network device of claim 1, wherein the advanced component is configured to transmit the packet on a high speed egress port.

18. The network device of claim 1, wherein each of the legacy component and advanced component comprise:
   a layer 2 clear bit;
   a layer 3 clear bit;
   a legacy clear enable register for enabling clearings of a layer 2 bitmap and a layer 3 bitmap;
   a legacy clear base register for defining a lower limit of allowed values of a layer 3 multicast index to enable clearings of the layer 2 bitmap and the layer 3 bitmap; and
   a legacy clear base register for defining an upper limit of allowed values of the layer 3 multicast index to enable clearings of the layer 2 bitmap and the layer 3 bitmap,
   wherein after the layer 3 multicast index for a multicast packet is determined on an ingress port, a component associated with the ingress port determines that the legacy clear enable register is set and that the legacy clear base register is less than or equal to the layer 3 multicast index which is less than or equal to the legacy clear base register, the component further determines if the layer 2 clear bit is set and zeros out a layer 2 bitmap, if the layer 2 bit is set, or sets the layer 2 bitmap if the layer 2 bit is not set, the component further determines if the layer 3 clear bit is set and zeros out a layer 3 bitmap, if the layer 3 bit is set, or sets the layer 3 bitmap if the layer 3 bit is not set.

19. A method for processing packets, the method comprising:
   receiving, by a legacy component, an incoming packet, the incoming packet requiring advanced processing;
   performing, by the legacy component, basic processing on the packet;
   transmitting, by the legacy component, the packet to a loop-back port on an advanced component;
   disabling, by the advanced component, basic processing, and performing advanced processing on the packet;
   sending, by the advanced component, the packet to at least one port in an ingress layer 2 distribution tree;
   if the packet is an unmodified packet, determining, by the at least one port in the ingress layer 2 distribution tree, whether to send at least one of a layer 2 copy or a layer 3 copy of the packet; and
   if the packet is a multicast packet:
      performing, by the advanced component, a layer 3 multicast look-up for layer 3 routing information; and
      assigning, by the advanced component, a layer 3 multicast index to the packet, the layer 3 multicast index being configured to determine an ingress layer 2 distribution tree and an egress layer 3 distribution tree for the packet.

* * * * *

UNITED STATES PATENT AND TRADEMARK OFFICE
CERTIFICATE OF CORRECTION

| | | |
|---|---|---|
| PATENT NO. | : 7,826,481 B2 | Page 1 of 1 |
| APPLICATION NO. | : 11/289369 | |
| DATED | : November 2, 2010 | |
| INVENTOR(S) | : Mohan Kalkunte et al. | |

It is certified that error appears in the above-identified patent and that said Letters Patent is hereby corrected as shown below:

In first page, in field (54), in "Title" in column 1, line 1-2, delete "NETWORK FOR SUPPORTING ADVANCE FEATURES ON LEGACY COMPONENTS" and insert -- NETWORK FOR SUPPORTING ADVANCED FEATURES ON LEGACY COMPONENTS --, therefor.

In column 1, line 1-2, delete "NETWORK FOR SUPPORTING ADVANCE FEATURES ON LEGACY COMPONENTS" and insert -- NETWORK FOR SUPPORTING ADVANCED FEATURES ON LEGACY COMPONENTS --, therefor.

Signed and Sealed this
Fifteenth Day of March, 2011

David J. Kappos
*Director of the United States Patent and Trademark Office*